UNITED STATES PATENT OFFICE.

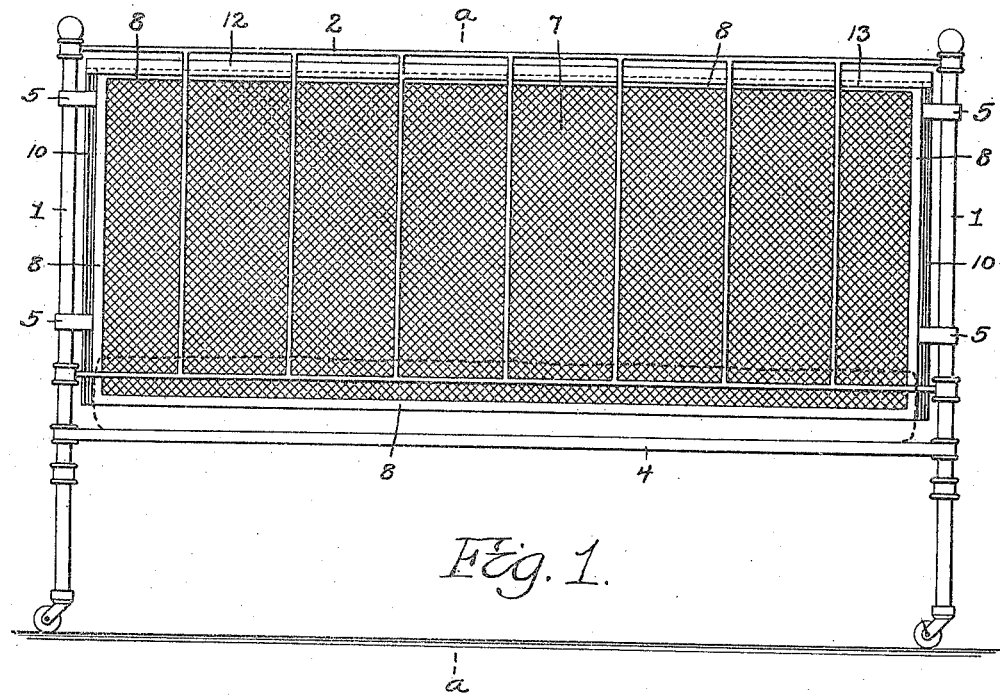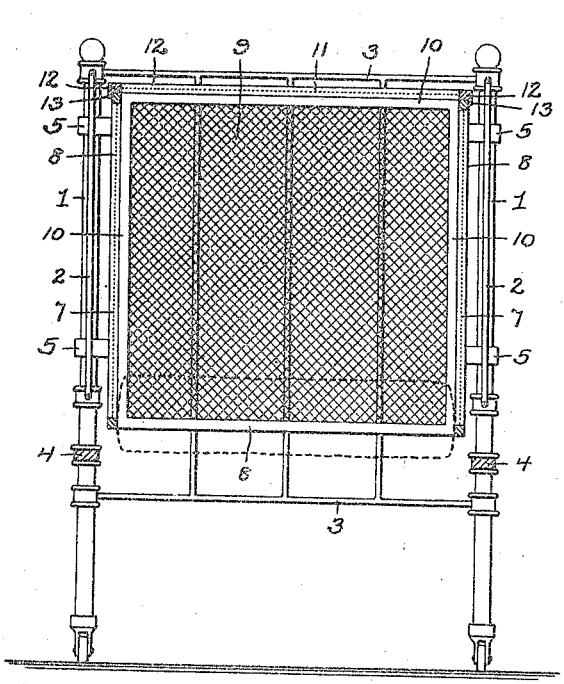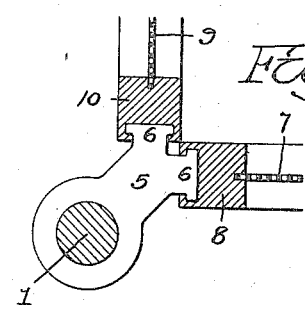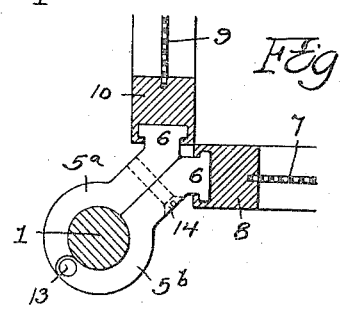

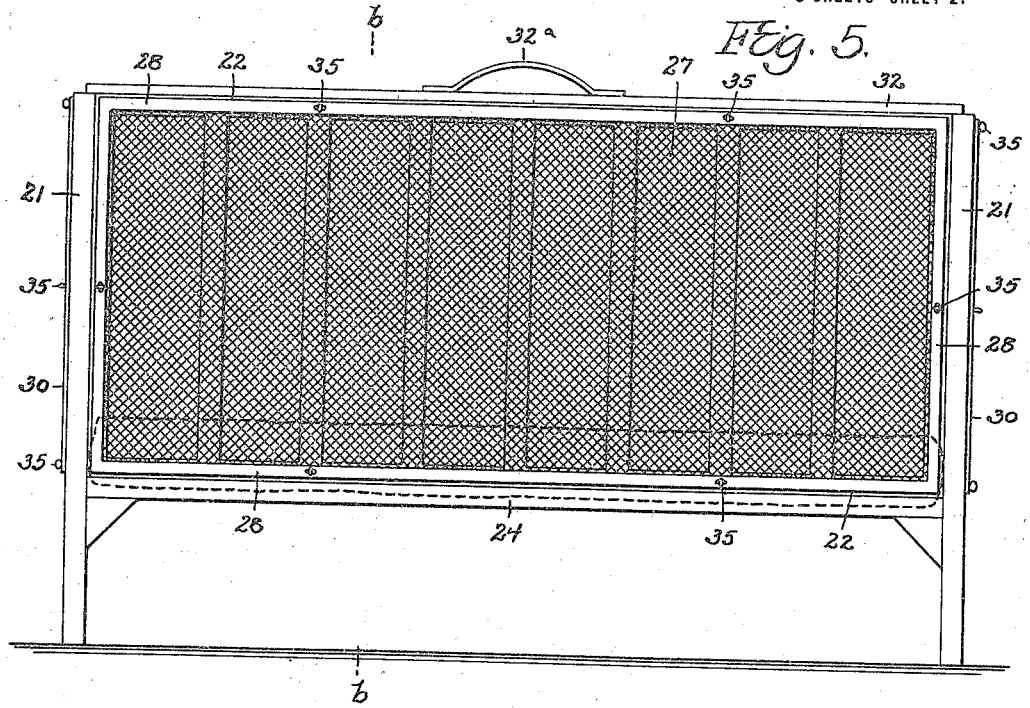

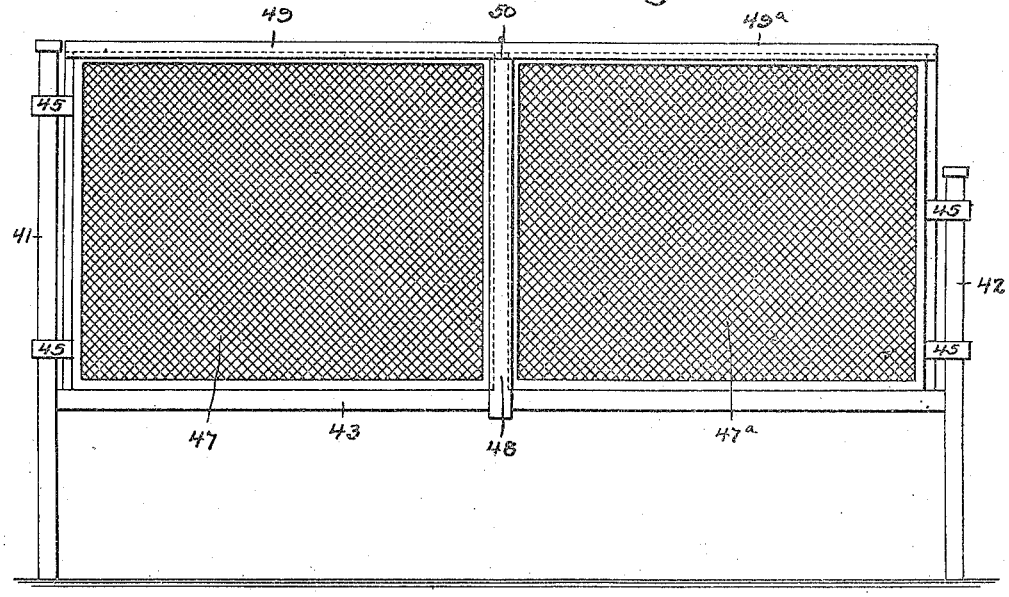
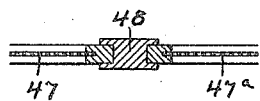
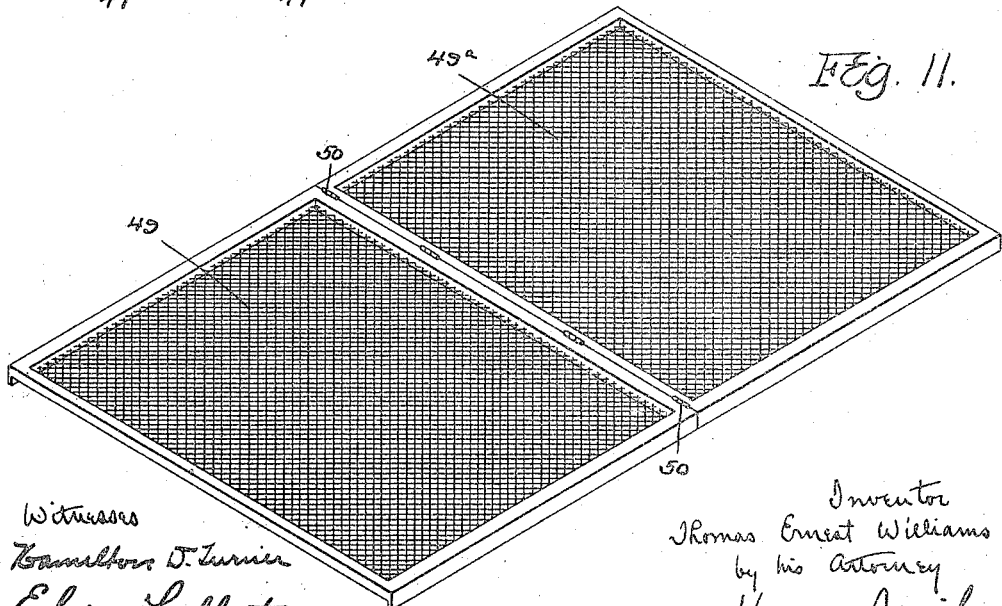

THOMAS ERNEST WILLIAMS, OF WINNIPEG, MANITOBA, CANADA, ASSIGNOR OF ONE-HALF TO LILLIE A. DEWEY, OF PHILADELPHIA, PENNSYLVANIA.

INSECT-SCREEN FOR CRIBS OR BEDS.

1,264,734.  Specification of Letters Patent.  Patented Apr. 30, 1918.

Application filed February 23, 1915. Serial No. 9,918.

*To all whom it may concern:*

Be it known that I, THOMAS ERNEST WILLIAMS, a subject of the King of England, residing in Winnipeg, Province of Manitoba, Dominion of Canada, have invented certain Improvements in Insect-Screens for Cribs or Beds, of which the following is a specification.

My invention relates to insect screens for cribs or beds, and has for its object the construction of such screens that they may be readily applied to or removed from a bed or crib; that they will be sightly, will be firmly mounted when in position, and when removed may be stored away in little space.

This object I attain in the manner hereinafter set forth, reference being had to the accompanying drawings, in which—

Figure 1 represents a side view of a metal crib equipped with screens in accordance with my invention;

Fig. 2 is a transverse vertical section on the line *a—a*, Fig. 1;

Fig. 3 is a horizontal section on an enlarged scale, through a corner post of the crib, showing a detail of the mounting of the screens;

Fig. 4 is a view similar to Fig. 3 but showing a modification of my invention;

Fig. 5 is a view similar to Fig. 1 but showing the screens as applied to a wooden crib;

Fig. 6 is a transverse vertical section on the line *b—b*, Fig. 5;

Fig. 7 is a sectional view, on an enlarged scale, of a corner portion of the crib shown in Figs. 5 and 6, showing a detail of the mounting of the screens upon such a crib;

Fig. 8 is a view similar to Fig. 7 but showing the application of screens to another type of wooden crib;

Fig. 9 is a view similar to Figs. 1 and 5 but showing my invention as applied to a full-sized bed;

Fig. 10 is a horizontal sectional view, on an enlarged scale, of one feature of my invention when employed as shown in Fig. 9, and Fig. 11 is a perspective view of one form of cover or top member of the screen.

Referring in the first instance to Figs. 1, 2 and 3 of the drawings, 1—1 represent the corner posts of a crib, 2—2 represent the sides thereof, and 3 represents the head board or foot board, as the case may be, and 4—4 represent the side rails. Fitted to each corner post, during the manufacture of the crib, are two or more brackets 5, each of which is equipped with a pair of tongues 6.

At each side of the crib there is a screen 7 carried by a frame 8, and at each end of the crib there is a screen 9 carried by a frame 10. The end bars of these frames 8 and 10 are each provided with grooves adapted to receive and be guided upon the tongues 6 on the brackets 5, consequently, these frames and the screens carried thereby may be placed in position to form a lateral inclosure by being each vertically dropped into place, and may correspondingly be removed by being each vertically lifted.

The bottom of this lateral inclosure is completely filled by the mattress, the position of which is indicated by dotted lines in Figs. 1 and 2, the spring of the crib being omitted.

The inclosure is completed by a horizontal top screen 11 carried by a frame 12, and in order to prevent accidental displacement of this top frame after it is placed in position the side bars thereof are equipped with depending flanges 13, which when the frame is properly placed, engage with the outside of the top bars of the side frames. If desired these flanges may be on the end bars instead of the side bars, or on all four bars.

To apply this inclosure to a crib already made the brackets 5, instead of being fitted upon the corner posts 1, may be removably attached thereto, as shown in Fig. 4, wherein the brackets consist of two portions, 5ᵃ and 5ᵇ hinged at 13 so that they may be swung apart to be applied to or removed from the post 1, and retained in clamping position when in use by means of a screw 14 or equivalent device, one tongue 6 being formed upon the part 5ᵃ and the other tongue upon the part 5ᵇ, as shown.

Figs. 5, 6 and 7 show the application of my improved screen inclosure to a wooden crib. In these figures 21—21 represent the corner posts of the crib, 22—22 the side frames thereof, 23 the head board or foot board, as the case may be, and 24 the side rails. In this construction the frames of the screens are applied to the frames of the sides, head board and foot board of the crib and such sides, head board and foot board are removable. For instance, the side screens 27 and their frames 28 are attached to the side frames 22 of the crib either fixedly or removably. As shown, they are removable, being attached to the sides by means of turn-buttons 35 (Fig. 5). Similarly, the end screens 29 and their frames 30 are attached respectively to the head board and foot board of the crib.

Each corner post 21 is provided with a pair of tongues 26, and the end members of the side frames, head board and foot board are each provided with grooves adapted to fit upon and slide over these tongues.

The bottom of this lateral inclosure also is closed by the mattress, the position of which is shown by dotted lines, the spring again being omitted, and the top is similarly closed by means of a screen 31 and its frame 32 which rests upon the top members of the sides and ends. In this case, however, another method is shown of preventing displacement of the top screen, this method being to have the top members of the sides, head board and foot board grooved to receive the frame 32, as shown in Fig. 6. To facilitate the application or removal of the top frame it may be equipped with handles 32$^a$, as shown in Figs. 5 and 6.

If it is desired to have independently removable screens on a crib of this type and to have the sides, head board and foot board fixed it may be accomplished as follows:

Each corner post 21 is provided with one or more plates 21$^a$, each having a pair of tongues 36, as shown in Fig. 8, and the end bars of the side and end screens are provided with grooves to fit over and slide upon these tongues, consequently, the screens may be applied or removed the same as those shown in Figs. 1 and 2.

In Fig. 9 is shown an inclosure made in accordance with my invention and applied to a full-sized bed, 41 being a corner post of the head board, 42 a corner post of the foot board, and 43 a side rail. Brackets 45 similar to those shown in Figs. 1 and 2 are mounted upon the corner posts, and the end members of the side and end screens are properly grooved to fit over the tongues on these brackets. In the case of a full-sized bed, however, the side screens would be of such length as to be unwieldly, and to overcome this defect I make each side screen in two sections 47 and 47$^a$ and upon each side rail midway between the head board and the foot board I mount a post 48 which is vertically grooved, as shown in Fig. 10, for the reception and guidance of the inner end bars of the frames of the screens 47 and 47$^a$. As thus made the parts of each side screen may be applied or removed separately and the size and weight of each is such that they may be easily handled. Correspondingly, I make the top screen in two parts, 49 and 49$^a$, as best shown in Fig. 11. While these two parts may be separate I prefer to have them hinged together at the center, as at 50, so that when not in use they may be folded over one upon the other or applied to the side screens in this folded position and then unfolded so as to entirely cover the top.

To get in or out of a bed so equipped it would be only necessary to fold over one-half of the top and then remove one member of either side screen.

Although I have, in each instance of the tongue-and-groove guide and retainer, shown the tongue as a fixed part and the groove formed in a movable part I do not limit myself to this construction, as it will be readily seen that the procedure might be reverse, the tongue being the movable part and the groove in the fixed part.

I shall, for the sake of brevity, refer in the claims to my invention as applied only to a "bed" but by this I mean not only bed but also crib, cot, or the like.

I claim:

1. The combination of the corner posts of a bed, the side and end members of a screen, and tongue-and-groove connections between said posts and said side and end members, said tongue-and-groove connections being open at the top so as to permit vertical removal of the screen members from the posts.

2. The combination of the corner posts of a bed with brackets secured thereto, said brackets having projecting tongues thereon and screen members grooved for the reception of said tongues and vertically removable therefrom.

3. The combination of the corner posts of a bed, two-part brackets embracing said corner posts and having tongues thereon, means for clamping said two-part brackets to said posts, and screen frames having end members grooved for the reception of said tongues and removable vertically therefrom.

4. The combination of the corner posts of a bed with brackets formed in two parts hinged together and adapted to embrace said corner posts, said brackets having tongues projecting therefrom, and a screen having end members grooved for the reception of said tongues and removable vertically therefrom.

In testimony whereof, I have signed my name to this specification in the presence of two subscribing witnesses.

THOMAS ERNEST WILLIAMS.

Witnesses:
ARCHIBALD R. DEWEY,
F. E. BARBER.